US012008778B2

(12) United States Patent
Kasuya et al.

(10) Patent No.: US 12,008,778 B2
(45) Date of Patent: Jun. 11, 2024

(54) INFORMATION PROCESSING APPARATUS, CONTROL METHOD FOR SAME, NON-TRANSITORY COMPUTER-READABLE STORAGE MEDIUM, AND VEHICLE DRIVING SUPPORT SYSTEM

(71) Applicant: CANON KABUSHIKI KAISHA, Tokyo (JP)

(72) Inventors: Nozomu Kasuya, Yokohama (JP); Kazuhiko Kobayashi, Yokohama (JP); Masahiro Suzuki, Kawasaki (JP); Daisuke Kotake, Yokohama (JP); Makoto Tomioka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 978 days.

(21) Appl. No.: 16/921,977

(22) Filed: Jul. 7, 2020

(65) Prior Publication Data

US 2020/0334843 A1    Oct. 22, 2020

Related U.S. Application Data

(63) Continuation of application No. PCT/JP2018/041668, filed on Nov. 9, 2018.

(30) Foreign Application Priority Data

Jan. 15, 2018  (JP) .................... 2018-004467

(51) Int. Cl.
*G06T 7/593*  (2017.01)
*G01S 7/48*  (2006.01)
(Continued)

(52) U.S. Cl.
CPC ............ *G06T 7/593* (2017.01); *G01S 7/4808* (2013.01); *G01S 7/4814* (2013.01); *G01S 17/08* (2013.01);
(Continued)

(58) Field of Classification Search
CPC .. G06T 7/593; G06T 7/70; G06T 2207/10012; G06T 2207/20081;
(Continued)

(56) References Cited

U.S. PATENT DOCUMENTS 7,224,290 B2   5/2007  Takenaga et al.
7,994,936 B2   8/2011  Takenaga et al.
(Continued)

FOREIGN PATENT DOCUMENTS

JP   2001-108434 A   4/2001
JP   2003-168197 A   6/2003
(Continued)

OTHER PUBLICATIONS

Keisuke Tateno, et al., "CNN-SLAM: Real-time dense monocular SLAM with learned depth prediction," IEEE Computer Society Conference on Computer Vision and Pattern Recognition (CVPR), 2017, pp. 1-10.
(Continued)

*Primary Examiner* — Santiago Garcia
(74) *Attorney, Agent, or Firm* — Venable LLP

(57) ABSTRACT

This invention provides an information processing apparatus comprising a first acquiring unit configured to acquire first distance information from a distance sensor, a second acquiring unit configured to acquire an image from an image capturing device, a holding unit configured to hold a learning model for estimating distance information from images, an estimating unit configured to estimate second distance information corresponding to the image acquired by the second acquiring unit using the learning model, and a generating unit configured to generate third distance information based on the first distance information and the second distance information.

18 Claims, 11 Drawing Sheets

(51) Int. Cl.

| | | |
|---|---|---|
| *G01S 7/481* | (2006.01) | |
| *G01S 17/08* | (2006.01) | |
| *G01S 17/89* | (2020.01) | |
| *G01S 17/931* | (2020.01) | |
| *G05D 1/00* | (2024.01) | |
| *G06T 7/70* | (2017.01) | |
| *G08G 1/16* | (2006.01) | |

(52) U.S. Cl.
CPC ............ *G01S 17/89* (2013.01); *G01S 17/931* (2020.01); *G05D 1/0251* (2013.01); *G06T 7/70* (2017.01); *G08G 1/16* (2013.01); *G06T 2207/10012* (2013.01); *G06T 2207/20081* (2013.01); *G06T 2207/30252* (2013.01)

(58) Field of Classification Search
CPC . G06T 2207/30252; G06T 2207/10021; G06T 2207/10024; G06T 2207/10028; G06T 2207/20076; G06T 2207/20084; G06T 2207/20221; G06T 2207/30244; G06T 7/11; G06T 7/521; G06T 7/579; G01S 7/4808; G01S 7/4814; G01S 17/08; G01S 17/89; G01S 17/931; G01S 17/86; G05D 1/0251; G05D 2201/0213; G05D 1/0274; G05D 1/0246; G08G 1/16; G08G 1/166; G01B 11/00; G01C 3/06

See application file for complete search history.

(56) References Cited

U.S. PATENT DOCUMENTS

| | | | | |
|---|---|---|---|---|
| 2003/0105578 A1* | 6/2003 | Takenaga | ................ | G08G 1/167 340/995.13 |
| 2010/0265101 A1 | 10/2010 | Takenaga et al. | | |
| 2012/0147150 A1* | 6/2012 | Kojima | ................ | H04N 25/704 348/E13.074 |
| 2015/0002627 A1* | 1/2015 | Wang | .................... | H04N 13/161 348/43 |
| 2015/0062302 A1* | 3/2015 | Uchiyama | ............ | H04N 13/239 348/46 |
| 2015/0110392 A1* | 4/2015 | Wang | ...................... | G06T 7/149 382/164 |
| 2015/0292884 A1* | 10/2015 | Fuchikami | ............... | G01C 3/08 348/135 |
| 2016/0140724 A1* | 5/2016 | Ji | ............................ | G06F 18/00 382/173 |
| 2017/0223339 A1* | 8/2017 | Kondo | ...................... | G06T 7/55 |
| 2017/0267177 A1* | 9/2017 | Nariyambut Murali | | ..................... G06F 18/24133 |
| 2018/0274915 A1* | 9/2018 | Tsurumi | ................. | G01C 11/02 |
| 2018/0373942 A1* | 12/2018 | Noda | ................... | G06V 10/764 |
| 2019/0022813 A1 | 1/2019 | Yamamoto | | |
| 2019/0212749 A1* | 7/2019 | Chen | ....................... | G06N 20/00 |
| 2019/0258251 A1* | 8/2019 | Ditty | ...................... | G06N 3/063 |
| 2020/0291447 A1* | 9/2020 | Marcelpoil | ............... | G06T 7/11 |
| 2021/0225006 A1* | 7/2021 | Grady | .................... | G06T 7/174 |

FOREIGN PATENT DOCUMENTS

| | | |
|---|---|---|
| JP | 2003-307561 A | 10/2003 |
| JP | 2006-038775 A | 2/2006 |
| JP | 2010-220001 A | 9/2010 |
| JP | 2012-123296 A | 6/2012 |
| JP | 2015-049200 A | 3/2015 |
| JP | 2016-085694 A | 5/2016 |
| JP | 2017-092983 A | 5/2017 |
| JP | 2017-184136 A | 10/2017 |
| JP | 6246411 B1 | 12/2017 |
| WO | 2014/162675 A1 | 10/2014 |
| WO | 2016/088483 A1 | 6/2016 |
| WO | 2017/057016 A1 | 4/2017 |

OTHER PUBLICATIONS

Jesse Levinson, et al., "Automatic Online Calibration of Cameras and Lasers," Robotics Science and Systems, 2013, pp. 1-8.

Christian Kerl, et al., "Dense Visual SLAM for RGB-D Cameras," Proc. of the Int. Conf. on Intelligent Robot Systems (IROS), 2013, pp. 1-4.

Philipp Krähenbühl, et al., "Efficient Inference in Fully Connected CFRs with Gaussian Edge Potentials," Neural Information Processing Systems, 2011, pp. 1-9.

Jan. 22, 2019 International Search Report in International Patent Appln. No. PCT/JP2018/041668.

Jan. 21, 2022 Japanese Official Action in Japanese Patent Appln. No. 2018-004467.

Jul. 22, 2022 Office Action in Japanese Patent Application No. 2018-004467.

* cited by examiner

INFORMATION PROCESSING APPARATUS, CONTROL METHOD FOR SAME, NON-TRANSITORY COMPUTER-READABLE STORAGE MEDIUM, AND VEHICLE DRIVING SUPPORT SYSTEM

CROSS-REFERENCE TO RELATED APPLICATIONS

This application is a Continuation of International Patent Application No. PCT/JP2018/041668, filed Nov. 9, 2018, which claims the benefit of Japanese Patent Application No. 2018-004467, filed Jan. 15, 2018, both of which are hereby incorporated by reference herein in their entirety.

BACKGROUND OF THE INVENTION

Field of the Invention

The present invention relates to an information processing apparatus, a control method for the information processing apparatus, a non-transitory computer-readable storage medium, and a vehicle driving support system.

Background Art

A technique has been conventionally known of measuring distance information using images captured from a plurality of viewpoints. In this technique, the measurement of distance is performed by calculating degrees of similarity between local regions of a plurality of images and searching for regions with highest similarity. However, it is difficult to calculate the correct distance if the subject has no texture or if the subject is a periodic pattern.

In order to solve this problem, a method of combining images captured from a plurality of viewpoints and measured distance information is used in PTL1.

In addition, as a method for measuring distance, a proposal is being made in NPTL1 of a method in which a convolutional neural network (CNN) is used to estimate distance information from an image captured using a monocular camera, and the distance information is corrected based on time-series information.

However, there are scenes that the method disclosed in PTL1 cannot deal with. In addition, there has been a demand for higher accuracy than that of the method disclosed in NPTL1.

The present invention has been made in view of such circumstances, and aims to provide a technique for obtaining distance information maintaining high accuracy in various scenes.

CITATION LIST

Patent Literature

PTL1: Japanese Patent Laid-Open No. 2015-49200

Non-Patent Literature

NPTL1: K. Tateno, F. Tombari, I. Laina and N. Navab, "CNN-SLAM: Real-time dense monocular SLAM with learned depth prediction", IEEE Computer Society Conference on Computer Vision and Pattern Recognition (CVPR), 2017

NPTL2: J. Levinson and S. Thrun, "Automatic Online Calibration of Cameras and Lasers," Robotics Science and Systems, 2013

NPTL3: C. Kerl, J. Sturm and D. Cremers, "Dense Visual SLAM for RGB-D Cameras," Proc. of the Int. Conf. on Intelligent Robot Systems (IROS), 2013

NPTL4: P. Krahenbuhl, V. Koltun, "Efficient Inference in Fully Connected CRFs with Gaussian Edge Potentials," Neural Information Processing Systems 2011

SUMMARY OF THE INVENTION

According to an aspect of the invention, there is provided an information processing apparatus comprising:
a first acquiring unit configured to acquire first distance information from a distance sensor;
a second acquiring unit configured to acquire an image from an image capturing device;
a holding unit configured to hold a learning model for estimating distance information from images;
an estimating unit configured to estimate second distance information corresponding to the image acquired by the second acquiring unit using the learning model, and
a generating unit configured to generate third distance information based on the first distance information and the second distance information.

Further features of the present invention will become apparent from the following description of exemplary embodiments with reference to the attached drawings.

DESCRIPTION OF THE EMBODIMENTS

Figure 1:
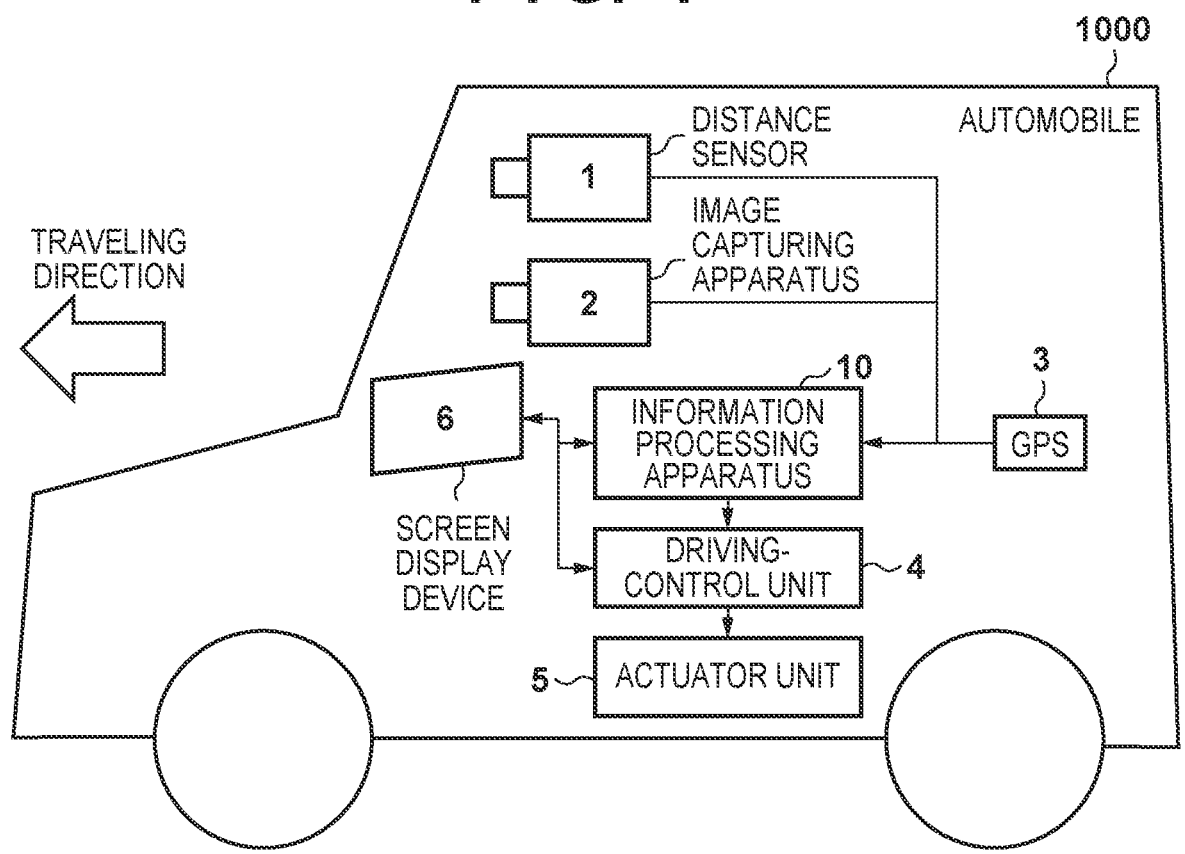
FIG. 1 is a configuration diagram illustrating a configuration of a driving-control system according to a first embodiment.

In the following, embodiments pertaining to the present invention will be described in detail based on the drawings.

Note that the configurations described in the following embodiments are mere examples, and the present invention is not limited to the configurations illustrated in the drawings.

First Embodiment

[Overview and Specific Use Case]

In the first embodiment, a measurement of distance in which LiDAR (light detection and ranging: detecting and ranging by light) is used and an estimation of distance, from an image captured with a monocular color camera, in which a CNN (Convolutional Neural Network) is used are performed, and the result of the measurement of distance and the result of the estimation of distance are combined to generate one distance information. A driving-control system (or driving support system) that recognizes the surrounding environment using a generated distance image and controls automobile driving will be described. By combining distances that are estimated from the monocular camera image using the CNN with distances measured by the LiDAR, distances can be acquired and stable control of automobile driving can be realized even in situations in which it is difficult to measure distances using the LiDAR, such as rainy or snowy weather, a case in which there is no object around, or a case in which objects are too close. In addition, distances can be similarly acquired and stable control of automobile driving can be similarly realized even in situations in which it is difficult to measure distances using a plurality of viewpoints, such as a case in which there is not much texture in the environment or a case in which there is a periodic pattern.

Note that a distance image is treated as the distance information in the present embodiment. The LiDAR and the monocular camera are calibrated in advance, and coordinates in a distance image acquired by the LiDAR and coordinates in a distance image estimated by the CNN can be mutually transformed. Note that the method disclosed in NPTL2 is used for the calibration, for example.

[Description of Configuration]

Figure 2:
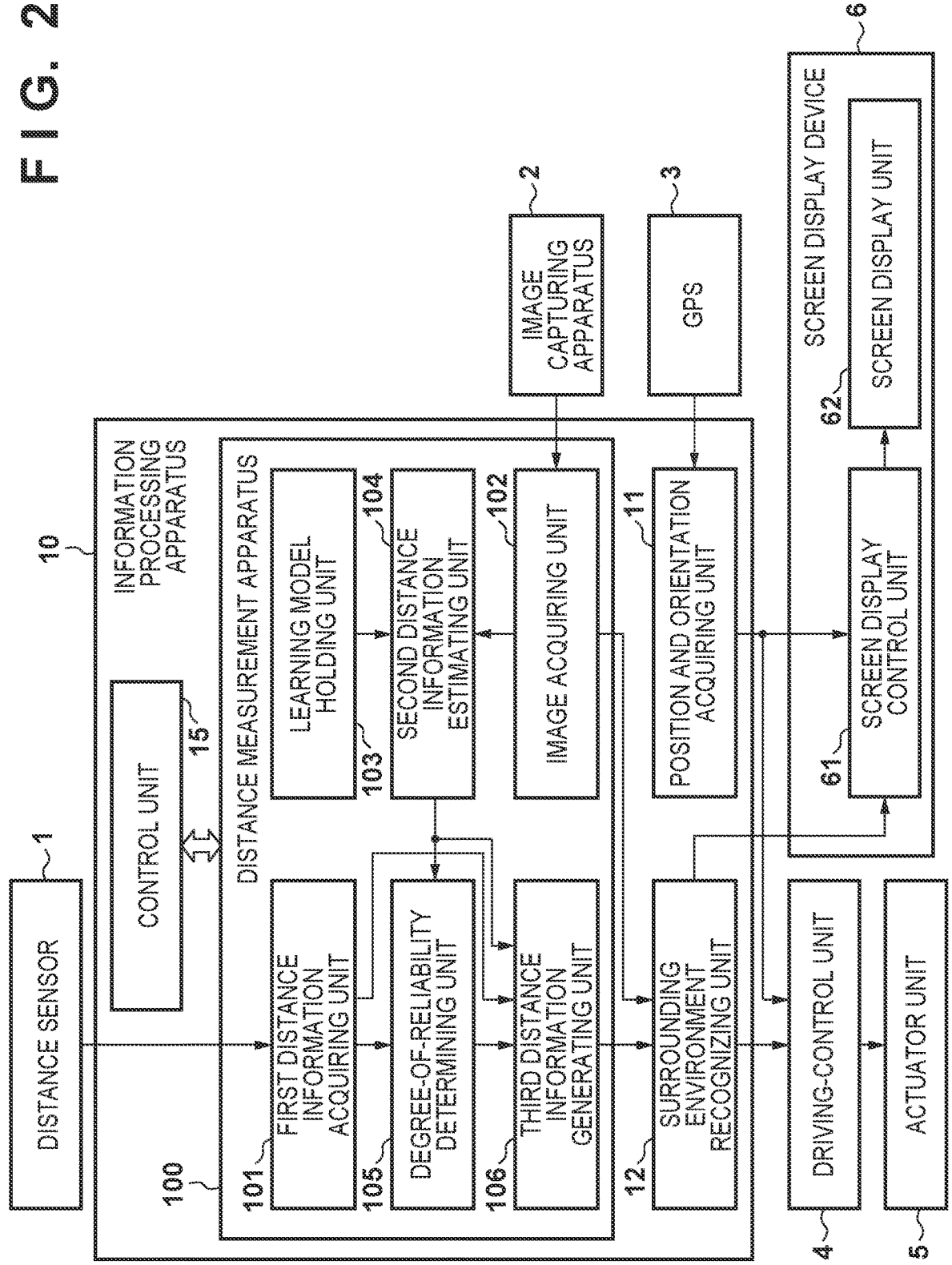
FIG. 2 is a block diagram illustrating a module configuration of the driving-control system according to the first embodiment.

An example of a configuration of a driving-control system that is for an automobile 1000 and that includes an information processing apparatus 10 according to the present embodiment will be described based on the system configuration diagram in FIG. 1 and the block diagram in FIG. 2.

The driving-control system includes a distance sensor 1, an image capturing device 2, a global positioning system (GPS) 3, a driving-control unit 4, an actuator unit 5, a screen display device 6, and the information processing apparatus 10. The screen display device 6 is constituted of a screen display control unit 61 and a screen display unit 62. The information processing apparatus 10 includes a position and orientation acquiring unit 11, a surrounding environment recognizing unit 12, a distance measurement device 100, and a control unit 15 that controls the entire apparatus, and acquires and generates information necessary to control driving. The control unit 15 includes a CPU, a program executed by the CPU, and a memory that is used as a work area. The distance measurement device 100 includes a first distance information acquiring unit 101, an image acquiring unit 102, a learning model holding unit 103, a second distance information estimating unit 104, a degree-of-reliability determining unit 105, and a third distance information generating unit 106, and generates a distance image in which output from the distance sensor and distances estimated by a CNN are combined. Note that a part of or all of the processing units included in the information processing apparatus 10 may be realized by a computer executing the program.

[Detailed Description of Configuration]

The distance sensor 1 is connected to the first distance information acquiring unit 101 of the distance measurement device 100, and measures distances in the surrounding environment in response to a request from the first distance information acquiring unit 101 and supplies the results of the measurement to the first distance information acquiring unit 101. While the distance sensor 1 in the present embodiment is described as being a LiDAR sensor, the distance sensor 1 may be a time-of-flight (ToF) sensor, for example.

The image capturing device 2 is connected to the image acquiring unit 102 of the distance measurement device 100, and captures an image of the surrounding environment in response to a request from the image acquiring unit 102 and supplies the image to the image acquiring unit 102. While the image capturing device is a monocular color camera in the present embodiment, the image capturing device may be a gray camera or an infrared camera. In addition, the image-capturing field angle range of the image capturing device 2 is the same as the range within which the distance sensor 1 measures distances.

The GPS 3 is connected to the position and orientation acquiring unit 11 of the information processing apparatus 10, and measures the current position of the vehicle in response to a request from the position and orientation acquiring unit 11 and supplies the result of the measurement to the position and orientation acquiring unit 11.

The driving-control unit 4 is connected to the position and orientation acquiring unit 11 and the surrounding environment recognizing unit 12 of the information processing apparatus 10, and based on the position and orientation of the vehicle acquired by the position and orientation acquiring unit 11 and the surrounding environment recognized by the surrounding environment recognizing unit 12, controls the driving of the automobile 1000 via the actuator unit 5.

The actuator unit 5 automatically or semi-automatically controls the torque and orientation of the wheels of the automobile based on commands from the driving-control unit 4.

The screen display control unit 61 of the screen display device 6 visualizes the input to the surrounding environment recognizing unit 12 and the result of the recognition by the surrounding environment recognizing unit 12, and displays the input and the result of the recognition on the screen display unit 62.

The position and orientation acquiring unit 11 of the information processing apparatus 10 acquires a self-position from the GPS 3 and supplies the self-position to the driving-control unit 4. The surrounding environment recognizing unit 12 of the information processing apparatus 10 receives an image from the image acquiring unit 102 of the distance measurement device 100 and receives a distance image from the third distance information generating unit 106 of the distance measurement device 100, performs recognition of the surrounding environment, and supplies the result to the driving-control unit 4.

The first distance information acquiring unit 101 of the distance measurement device 100 acquires a distance image from the distance sensor 1, and supplies the distance image to the degree-of-reliability determining unit 105. The image acquiring unit 102 acquires captured images by outputting image capture commands to the image capturing device 2 on a regular basis, and supplies the acquired images to the second distance information estimating unit 104 and the surrounding environment recognizing unit 12. Note that the shorter the cycle of the image capture commands, the better, but it suffices to determine the cycle based on the processing capabilities of various processing units.

The learning model holding unit 103 holds a learning model to be used by the second distance information estimating unit 104 to estimate distance information from an image supplied from the image acquiring unit 102, and supplies the learning model to the second distance information estimating unit 104 when there is a request from the second distance information estimating unit 104. The learning model that the learning model holding unit 103 holds is a later-described CNN model for deep learning. The second distance information estimating unit 104 estimates second distance information from an image supplied from the image acquiring unit 102 using the learning model that the learning model holding unit 103 holds, and supplies the second distance information to the degree-of-reliability determining unit 105.

The degree-of-reliability determining unit 105 determines degrees of reliability of each of the first distance information supplied from the first distance information acquiring unit 101 and the second distance information supplied from the second distance information estimating unit 104, and supplies the degrees of reliability to the third distance information generating unit 106.

The third distance information generating unit 106 generates third distance information by combining the first distance information and the second distance information based on the degrees of reliability calculated by the degree-of-reliability determining unit 105, and supplies the third distance information to the surrounding environment recognizing unit 12.

[Description of Processing Procedure Flowchart]

Figure 3:
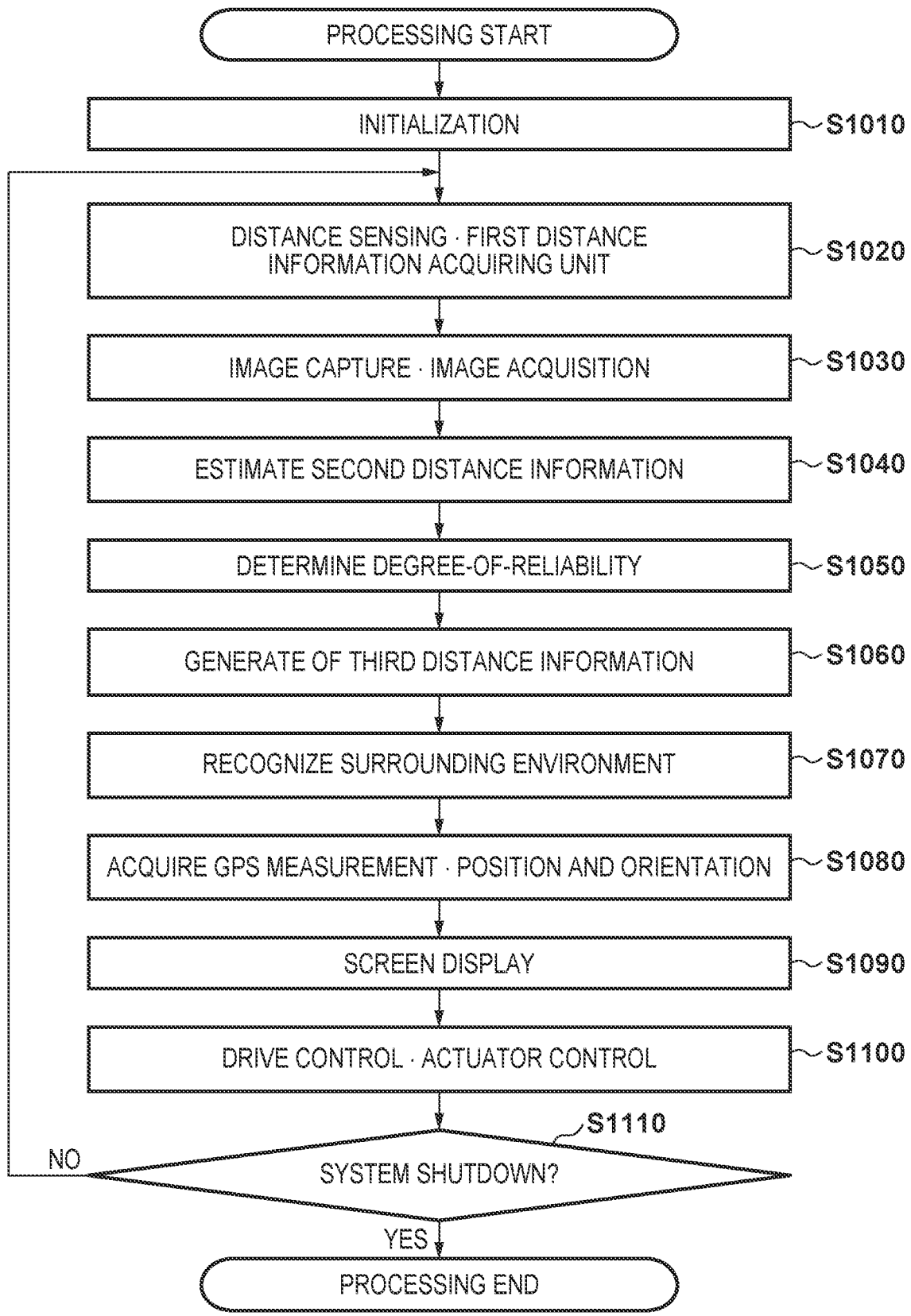
FIG. 3 is a flowchart illustrating a processing procedure of the driving-control system according to the first embodiment.

Next, a processing procedure of the information processing apparatus 10 and the driving-control system in the first embodiment having configurations as described above will be described using the flowchart in FIG. 3.

Initialization Processing

In step S1010, the control unit 15 initializes the system. The control unit 15 activates devices connected to the information processing apparatus 10, sets parameters, loads the learning model, and loads calibration values of the sensor and the image capturing device.

Acquisition of First Distance Information

In step S1020, the control unit 15 controls the first distance information acquiring unit 101 and causes the first distance information acquiring unit 101 to output an image capture command to the distance sensor 1. The distance sensor 1 performs the sensing of distances in the scene in accordance with this command. The first distance information acquiring unit 101 acquires, as a distance image, the information obtained by sensing distances using the distance sensor 1.

Acquisition of Image

In step S1030, the control unit 15 controls the image acquiring unit 102 and causes the image acquiring unit 102 to output an image capture command to the image capturing device 2. The image capturing device 2 captures an image of the scene in accordance with this command. The image acquiring unit 102 acquires the image captured by the image capturing device 2. In the present embodiment, the image obtained by the image capturing device 2 is an image having three components, namely the R, G, and B components, per pixel.

Estimation of Second Distance Information

In step S1040, the control unit 15 controls the second distance information estimating unit 104, and uses the learning model held by the learning model holding unit 103 to estimate a distance image from the image acquired by the image acquiring unit 102 in step S1030. While the method of estimation is not particularly important here since it suffices as long as a distance image can be estimated from the image using the learning model, the estimation is performed using the method disclosed in NPTL1, for example. Other known methods may of course be used.

Determination of Degrees of Reliability

In step S1050, the control unit 15 controls the degree-of-reliability determining unit 105 and determines degrees of reliability of the first distance image acquired by the first distance information acquiring unit 101 and the second distance image estimated by the second distance information estimating unit 104. For each pixel in each image, a degree of reliability is determined as a real number within the range from 0 to 1.

In the present embodiment, the second distance image is calculated by estimation in which the CNN is used, and thus, a parameter value, e.g., 0.5, stored in a storage medium that is not illustrated in the drawings is uniformly set, in advance, as degrees of reliability of the second distance image. In addition, normalized values of intensities of reflection of the laser light from the LiDAR are used as degrees of reliability of the first distance image.

Generation of Third Distance Information

In step S1060, the control unit 15 controls the third distance information generating unit 106, and combines the first distance image and the second distance image based on the degrees of reliability calculated by the degree-of-reliability determining unit 105 and generates a third distance image.

The third distance information generating unit 106 in the present embodiment generates a distance image in the coordinate system of the second distance image as the third distance image. A distance value is calculated for each pixel in the third distance image by performing weighted averaging in which the degrees of reliability of the corresponding pixels in the first distance image and the second distance image are used as weights. A pixel position in the first distance image that corresponds to a pixel in the second distance image is calculated by transforming coordinates using a value calibrated in advance. Accordingly, regions that the distance sensor is not good at dealing with can be covered using the results obtained by estimating distances from the image using the CNN. Alternatively, the distances estimated can be preferentially used if the estimated distances have high accuracy.

When the distance at coordinates (x, y) in the first distance information is D1(x, y), the degree of reliability thereof is W1, the distance at the coordinates (x, y) in the second distance information is D2(x, y), and the degree of reliability thereof is W2 (fixed to "0.5" in the present embodiment), it suffices to calculate the distance D3(x, y) at the coordinates (x, y) in the third distance information in accordance with the following expression.

$$D3(x,y)=\{W1 \times D1(x,y)+W2 \times D2(x,y)\}/(W1+W2)$$

Recognition of Surrounding Environment

In step S1070, the control unit 15 controls the surrounding environment recognizing unit 12, and performs recognition of the surrounding environment based on the image acquired by the image acquiring unit 102 and the distance image generated by the third distance information generating unit 106. Specifically, the surrounding environment recognizing unit 12 performs recognition of objects in the surroundings and states of the surroundings from the captured image using deep learning, etc., and acquires the distances to the objects from the distance image. The method of recognition of the surrounding environment is not limited to this, and any method may be used as long as an image and distance information used to control driving are used.

Acquisition of Position and Orientation

In step S1080, the control unit 15 controls the position and orientation acquiring unit 11, and acquires the current position of the automobile 1000 from the GPS 3 and estimates the orientation of the automobile 1000 from a change in the position.

Displaying on Screen

In step S1090, the control unit 15 controls the screen display control unit 61, and causes the screen display control unit 61 to generate an image to be displayed based on the result of the processing by the surrounding environment recognizing unit 12 and the position and orientation acquired and estimated by the position and orientation acquiring unit 11. The screen display control unit 61 outputs the generated image to the screen display unit 62. Consequently, the screen display unit 62 displays the image to a person on board the automobile. Note that the image generated by the screen display control unit 61 is, for example, an image obtained by generating the third distance image as a black-and-white distance image, assigning the degrees of reliability in the first distance information and the second distance information to a red channel and a blue channel, respectively, and normalizing the values of the degrees of reliability into values from 0 to 255. Consequently, it can be visualized which distance information was used for measurement.

Note that the result of the recognition of the environment may also be visualized by generating the third distance image as a black-and-white distance image, enclosing an object region recognized through the surrounding environment recognition processing with a rectangle, and providing an indication of an object type using characters, or by providing indications of a rectangle that is an object region, an object type label, and the distance to the object on the image captured by the image capturing device.

In addition, similarly to conventional car navigation systems, the result of the recognition of the surrounding environment may be displayed in a bird's eye view by displaying the position and the orientation of the self-vehicle on a map and displaying objects, etc., recognized through the surrounding environment recognition processing as dots or rectangles. In addition, the image forming method is not limited to the above-described methods, and any method may be adopted as long as the result of the recognition and the position and orientation of the automobile 1000 can be identified.

Control of Driving

In step S1100, the control unit 15 controls the driving-control unit 4, and based on the results of the processing by the surrounding environment recognizing unit 12 and the position and orientation acquired and estimated by the position and orientation acquiring unit 11, controls the automobile 1000 via the actuator unit 5.

System Shutdown

In step S1110, the control unit 15 determines whether or not to shut down the system. The control unit 15 shuts down the system if the destination has been reached or if a shutdown command is input by a user via an input unit that is not illustrated in the drawings. Otherwise, the control unit 15 returns the processing to step S1020 and continues with the processing.

[Effects]

In the first embodiment, by estimating a distance image by applying the learning model to an input image and combining the distance image with distances measured with the distance sensor (LiDAR) as described above, distances can be acquired even in environments or portions in which distance cannot be acquired using only the distance sensor, using only the measurement of distance using a plurality of viewpoints, or by merely combining these, and the control of the driving of the automobile can be performed in a wider variety of environments.

[Modification 1]

In the above-described first embodiment, normalized values of intensities of reflection of laser light are adopted as degrees of reliability of the first distance image for individual pixels. However, the method for determining degrees of reliability of the distance image is not limited to this. 0 may be set as the degree of reliability of a pixel for which a distance value could not be acquired, and a preset value, such as 0.5 for example, may be uniformly set to pixels for which distance values were successfully acquired.

The degrees of reliability may be determined based on the range of the operating distance of the distance sensor. For example, 1 may be set as degrees of reliability within the effective range, 0 may be set as degrees of reliability outside the effective range, and the vicinity of the boundary of the effective range may be interpolated with a spline curve or straight line set in advance. Accordingly, a case in which there is no object in the surroundings and a case in which measurement cannot be performed due to objects being located at too close a distance can also be dealt with.

The method adopted for the degrees of reliability of the second distance image is also not limited to a method as described in the first embodiment in which a preset value is uniformly set. The likelihood of the estimation of distances using the CNN may be normalized into values from 0 to 1 and may be set as the degrees of reliability of individual pixels.

The degrees of reliability of the first and second distances may be determined based on the continuity with neighboring regions. Specifically, a reciprocal of frequency may be normalized into a value from 0 to 1, or a gradient may be calculated from neighboring regions and a value obtained by normalizing a reciprocal of a difference from a distance value predicted from the gradient may be set.

In addition, degrees of reliability need not be set for each pixel, but rather, individual regions segmented in lattice shapes or individual regions obtained by dividing an input image into regions may have degrees of reliability. As the degree of reliability of an individual region, an average or a median of degrees of reliability calculated for individual pixels may be used. In that case, when the combining is performed, reference is made to the degree of reliability of a region including the target pixel.

[Modification 2]

When the third distance information is generated in the first embodiment, distance values in the third distance image are calculated by performing, for each pixel, weighted averaging in which degrees of reliability are used as weights. However, the method for generating the third distance image is not limited to this, as long as the combining is performed based on the degrees of reliability of the first distance information and the second distance information. The value having a higher degree of reliability may be adopted for each pixel, or weighted averaging may be performed after removing distance values for which degrees of reliability that are lower than a preset threshold are calculated.

Furthermore, noise removal processing such as smoothing processing may be applied after the third distance information is generated by combining the first distance information and the second distance information.

In addition, the third distance image is generated based on the coordinate system of the second distance image in the first embodiment. However, the third distance image may be generated based on the coordinate system of the first distance image or may be generated based on a different coordinate system.

[Modification 3]

In the first embodiment, LiDAR is used as the distance sensor. However, the distance sensor is not limited to LiDAR, and a passive stereo-type distance sensor realized by a plurality of cameras may be used, or an active stereo-type distance sensor realized by a projector and cameras may also be used.

If a passive stereo-type or active stereo-type distance sensor is used, a method of normalizing the degrees of similarity calculated when stereo matching is performed and setting the results as degrees of reliability may be adopted, besides the calculation method described in modification 1.

[Modification 4]

In the first embodiment, the transformation of coordinates between the first distance information and the second distance information is realized using information calibrated in advance. However, the method for position matching is not limited to this, and position matching may be performed by performing an optimization calculation so that the pieces of distance information match the most, or by performing an optimization calculation so that boundary portions match. Such position matching of the pieces of distance information may be performed only the first time, may be performed every time, may be performed only when a deviation is detected, or may be performed at a preset interval.

[Modification 5]

In the first embodiment, the third distance information is generated by combining the distance information acquired by the distance sensor and the distance information estimated by applying the CNN to an image captured by the image capturing device. Furthermore, the third distance information is used to control automobile driving. However, there is no limitation to this. For example, the third distance information may be used to determine depths when image synthesis is performed in augmented reality (AR), etc., or may be used for the estimation of the self-position and orientation of a mobile robot or for the estimation of the self-position and orientation of a head-mounted display (HMD) or a mobile terminal. The third distance information may also be used to control an indoor cleaning robot, an aircraft-type drone, an underwater mobile device, etc.

Second Embodiment

Similarly to the first embodiment, the information processing apparatus and the driving-control system in the second embodiment generate third distance information by combining distance information acquired from a distance sensor (LiDAR) and distance information estimated from one image capturing device (camera) using a CNN, and controls automobile driving based on the generated distance information. In the first embodiment, the distance information acquired by the distance sensor and the distance information estimated from an image captured by the image capturing device using the CNN are directly combined. Meanwhile, the second embodiment is characterized for the use, as disclosed in NPTL1, of map information constructed using the simultaneous localization and mapping (SLAM) technique, in which the estimation of a self-position and the creation of an environment map are simultaneously performed.

[Description of Configuration]

Figure 4:
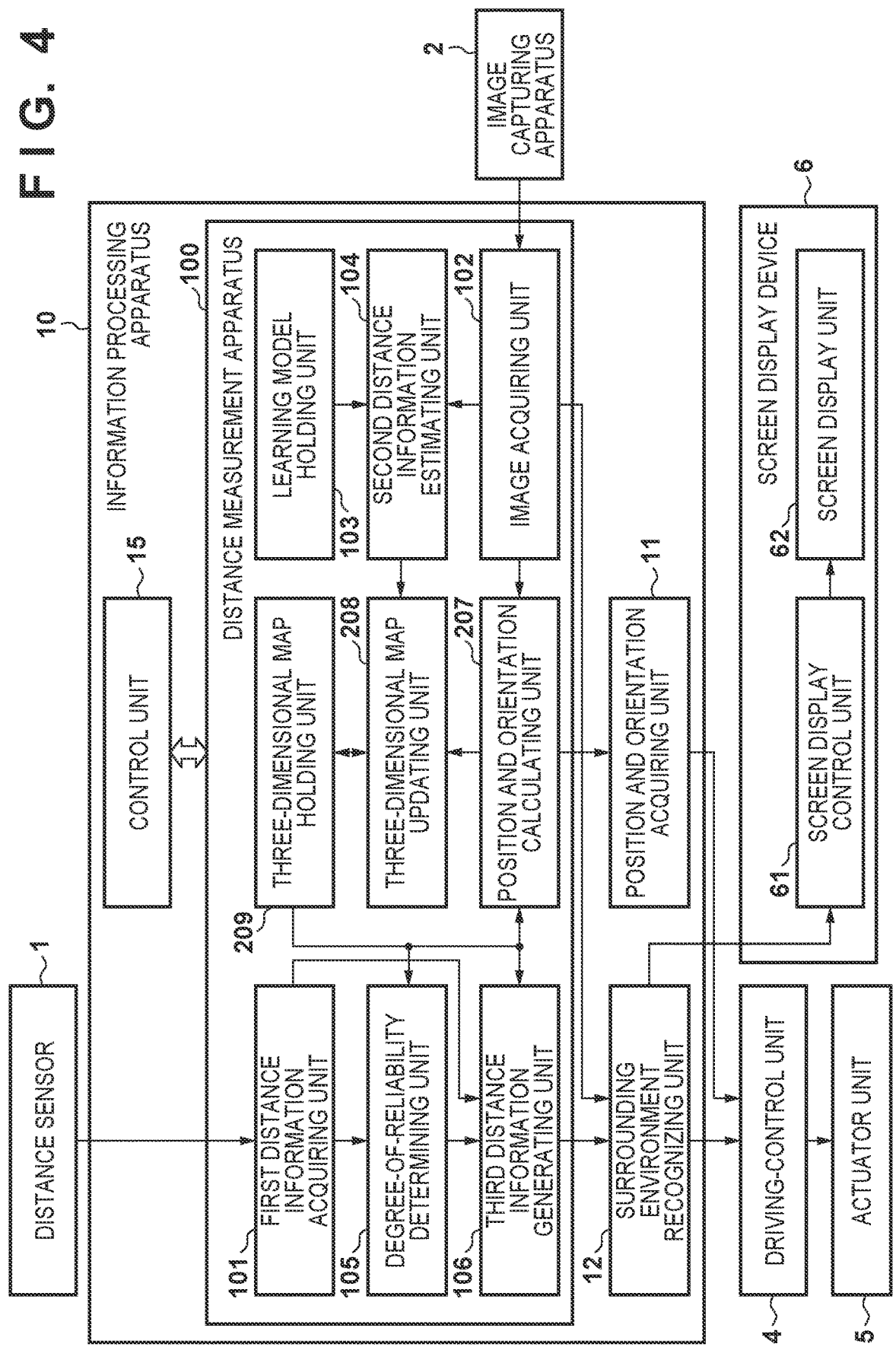
FIG. 4 is a block diagram illustrating a module configuration of a driving-control system according to a second embodiment.

FIG. 4 is a block diagram illustrating a module configuration of the information processing apparatus 10 and the driving-control system in the second embodiment. Components similar to those in the first embodiment (FIG. 2) are provided with the same reference numerals, and description of such components is omitted. In the second embodiment, a position and orientation calculating unit 207, a three-dimensional map updating unit 208, and a three-dimensional map holding unit 209 are added to the components in the first embodiment. The image acquiring unit 102 also supplies the image acquired from the image capturing device 2 to the position and orientation calculating unit 207, as well as to the second distance information estimating unit 104 and the surrounding environment recognizing unit 12. The second distance information estimating unit 104 is disconnected from the degree-of-reliability determining unit 105, and is newly connected to the three-dimensional map updating unit 208. The degree-of-reliability determining unit 105 is disconnected from the second distance information estimating unit 104, and is newly connected to the three-dimensional map holding unit 209.

The position and orientation calculating unit 207 calculates, based on a three-dimensional map held by the three-dimensional map holding unit 209, the position and orientation of the image capturing device 2, which captured the image supplied from the image acquiring unit 102, and supplies the information to the three-dimensional map updating unit 208.

The three-dimensional map updating unit 208 updates the three-dimensional map held by the three-dimensional map holding unit 209 based on the results of the processing by the position and orientation calculating unit 207 and the second distance information estimating unit 104.

The three-dimensional map holding unit 209 holds, as the three-dimensional map, a set of key frames that each include a pair of a position/orientation and a distance image. The three-dimensional map is not limited to having such a form, and the three-dimensional map may be a set of three-dimensional point groups such as a point cloud, or may be any form of distance information used in the SLAM technique.

The degree-of-reliability determining unit 105 determines degrees of reliability of the first distance information supplied from the first distance information acquiring unit 101 and the three-dimensional map held by the three-dimensional map holding unit 209.

The position and orientation acquiring unit 11 acquires the position and orientation of the image capturing device 2 calculated by the position and orientation calculating unit 207, and performs conversion into the position and orientation of the automobile 1000 using a parameter calibrated in advance and supplies the result to the driving-control unit 4. Note that, similarly to the first embodiment, a GPS may be included, and the position and orientation of the automobile 1000 may be acquired by the position and orientation acquiring unit 11 and supplied to the driving-control unit 4.

[Processing Procedure]

Figure 5:
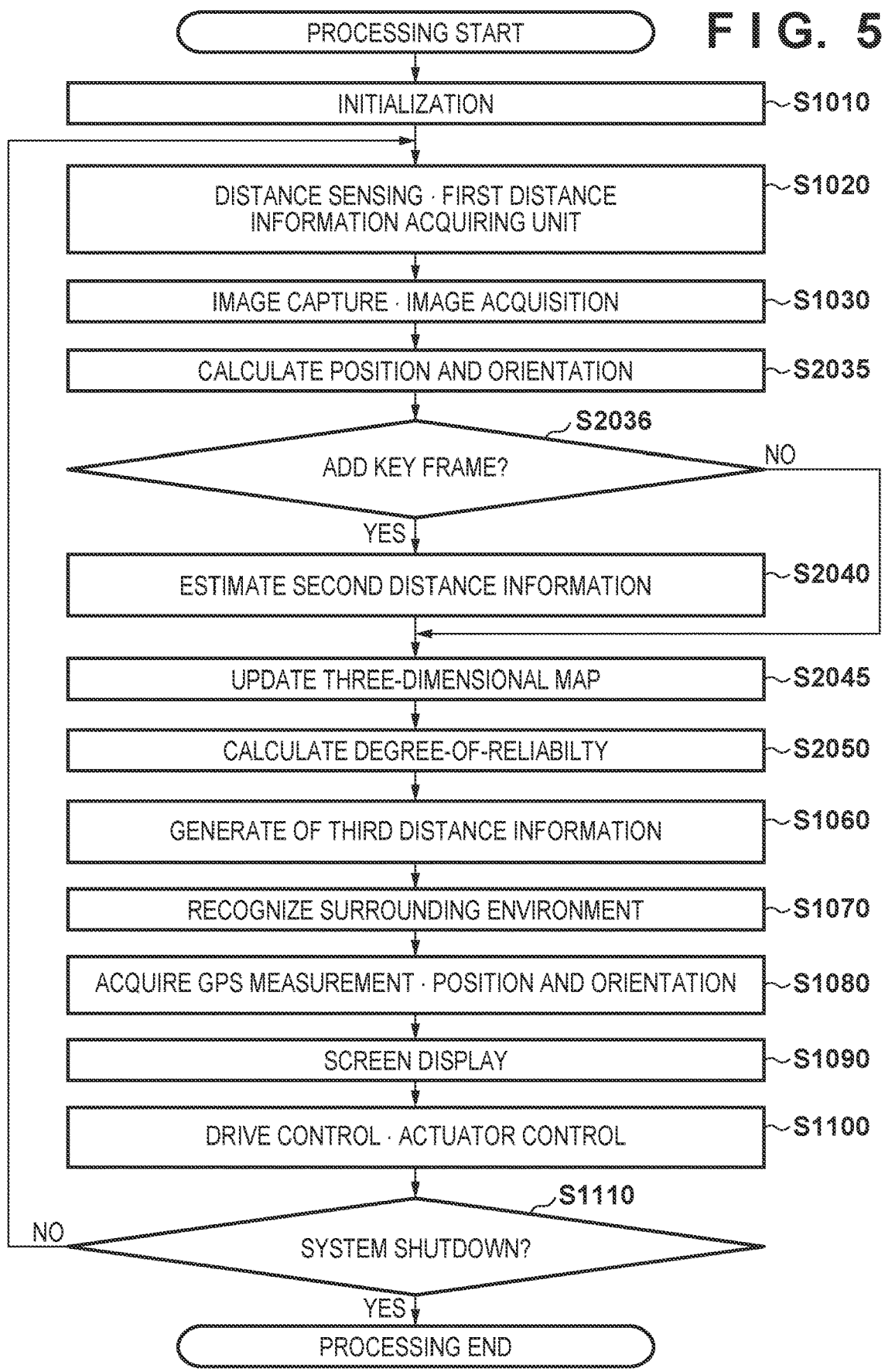
FIG. 5 is a flowchart illustrating a processing procedure of the driving-control system according to the second embodiment.

FIG. 5 is a flowchart illustrating a processing procedure of the driving-control system in the second embodiment. Note that processing similar to that in the first embodiment (FIG. 3) is indicated with the same step number provided thereto, and description of the same processing will be omitted. In addition, the processing from step S1030 to step S2045 is the processing in the method for calculating the position and orientation of an image capturing device disclosed in NPTL1. The three-dimensional map in the present embodiment is a set of key frames that each include a pair of a position/orientation and a distance image.

Calculation of Position and Orientation

In step S2035, the control unit 15 controls the position and orientation calculating unit 207, and calculates, based on the three-dimensional map held by the three-dimensional map holding unit 209, the position and orientation of the image capturing device 2 when the image acquired in step S1030 was captured. If processing is performed for the first time and there is no three-dimensional map, the position of the image capturing device 2 is set as the origin.

Determination of Addition of Key Frame

In step S2036, the control unit 15 determines whether or not to add the current frame as a key frame to the three-dimensional map. The adding processing is performed in cases such as when there is a significant change from the positions of key frames held by the three-dimensional map holding unit 209. The control unit 15 shifts the processing to step S2040 if the current frame is to be added as a key frame, and shifts the processing to step S2045 if the current frame is not to be added as a key frame.

Estimation of Second Distance Information

In step S2040, the control unit 15 controls the second distance information estimating unit 104, and uses the learning model held by the learning model holding unit 103 to estimate a distance image from the image acquired by the image acquiring unit 102 in step S1030.

Updating of Three-Dimensional Map

In step S2045, the control unit 15 controls the three-dimensional map updating unit 208, and updates the three-dimensional map based on the result of the calculation of the position and orientation in step S2035 or the result of the estimation of the second distance information in step S2040. The specific update method is as disclosed in NPTL1.

Determination of Degrees of Reliability

In step S2050, the control unit 15, similarly to the first embodiment, controls the degree-of-reliability determining unit 105, and causes the degree-of-reliability determining unit 105 to determine the degrees of reliability of the first distance image acquired by the first distance information acquiring unit 101 in step S1020 and the three-dimensional map held by the three-dimensional map holding unit 209.

With regard to the degrees of reliability of the three-dimensional map, a distance image at the current frame is generated from the three-dimensional map held by the three-dimensional map holding unit 209, and degrees of reliability are calculated for the generated distance image. Here, values in the uncertainty map disclosed in NPTL1 are used as the degrees of reliability. The method for calculating the degrees of reliability of the three-dimensional map is not limited to this method, and the method described in the first embodiment may be used, or a method described in the modifications of the first embodiment may be used.

[Effects]

As described above, in the second embodiment, distance information having a higher degree of reliability is generated by combining distance information acquired using the distance sensor and a three-dimensional map generated using the CNN-SLAM method disclosed in NPTL1. By using the CNN-SLAM, the results of the estimation of distance using the CNN can be refined over time, and three-dimensional information with even higher accuracy can be acquired. In addition, due to the position and orientation of the image capturing device being estimated from images, the position and orientation can be acquired with a higher degree of accuracy compared to when the position and orientation are acquired using a GPS. Automobile driving can be controlled more stably because the accuracy of the three-dimensional information and the position/orientation is increased.

Third Embodiment

The information processing apparatus and the driving-control system described in the third embodiment use, for the estimation of the position and orientation of the image capturing device in CNN-SLAM, third distance information generated by combining the result of the measurement of distance performed by the distance sensor and the three-dimensional map information estimated by CNN-SLAM.

[Description of Configuration]

Figure 6:
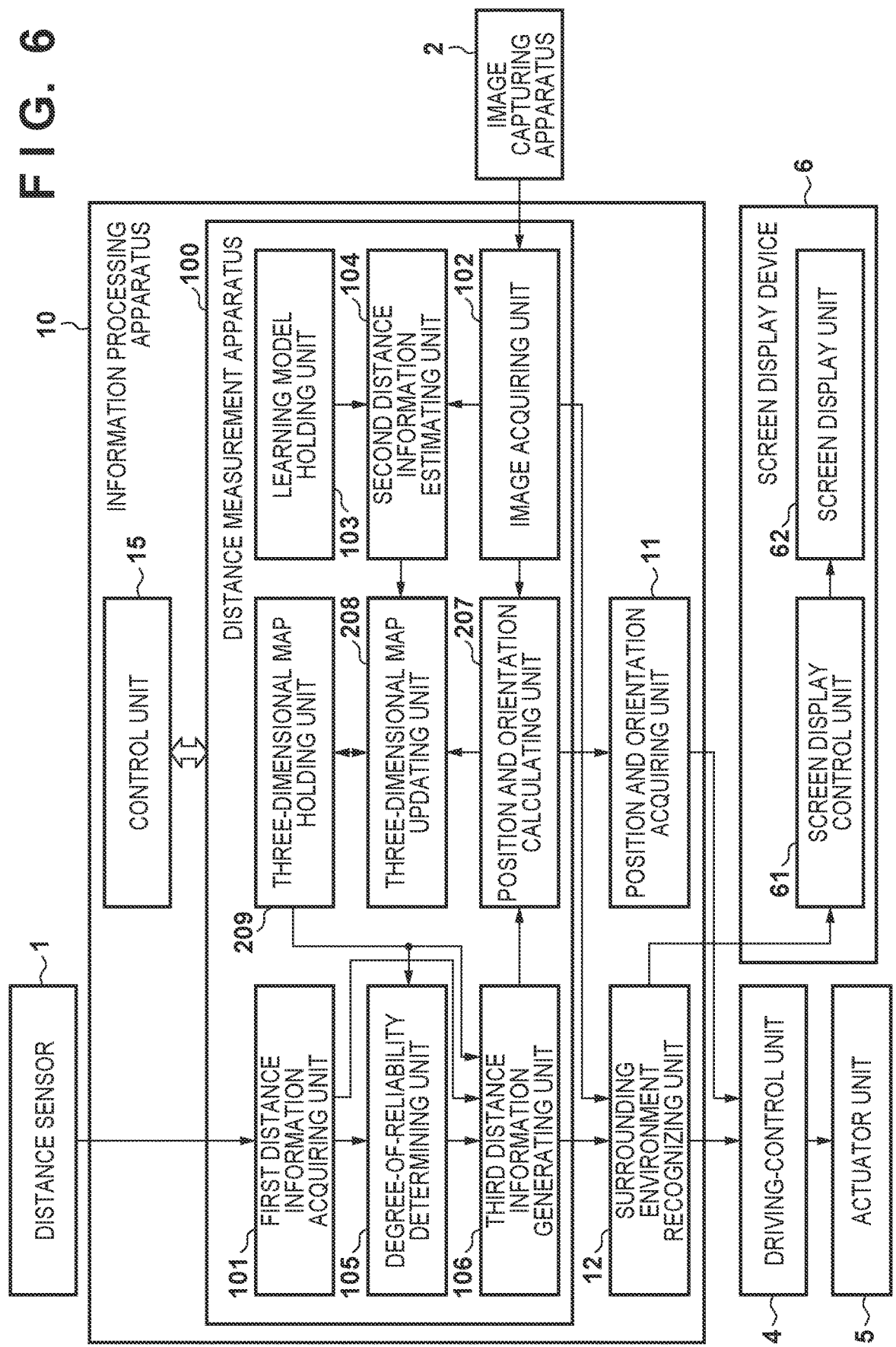
FIG. 6 is a block diagram illustrating a module configuration of a driving-control system according to a third embodiment.

FIG. 6 is a block diagram illustrating a module configuration of the information processing apparatus 10 and the driving-control system in the third embodiment. Components similar to those in the first embodiment (FIG. 2) and the second embodiment (FIG. 4) are provided with the same reference numerals. The difference from the second embodiment is that the input to the position and orientation calculating unit 207 is not the three-dimensional map held by the three-dimensional map holding unit 209, but rather, is the three-dimensional information generated by the third distance information generating unit 106.

[Processing Procedure]

Figure 7:
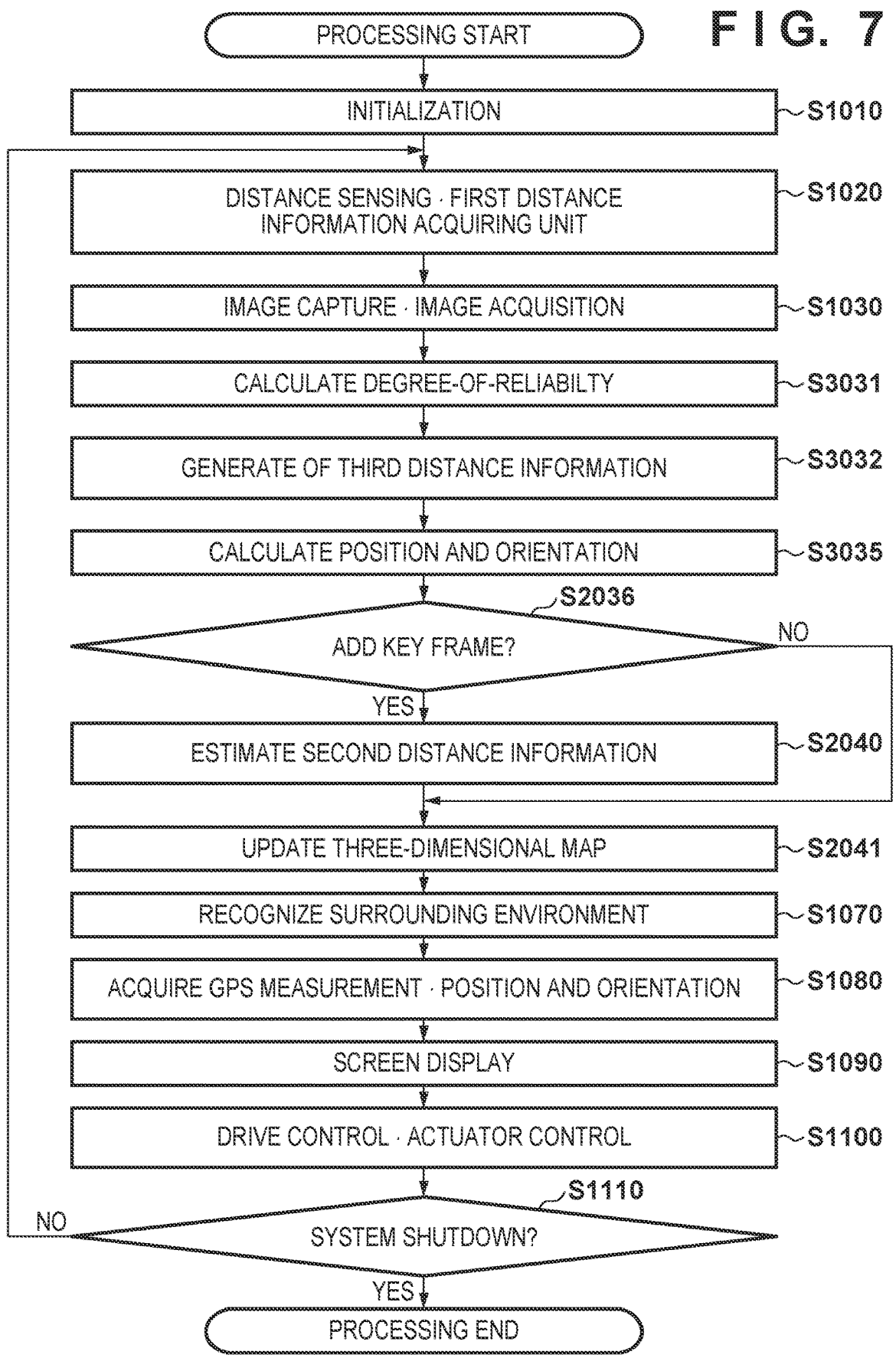
FIG. 7 is a flowchart illustrating a processing procedure of the driving-control system according to the third embodiment.

FIG. 7 is a flowchart illustrating a processing procedure of the driving-control system in the third embodiment. Note that processing similar to that in the first embodiment (FIG. 3) and the second embodiment (FIG. 5) is provided with the same step number, and description of the processing will be omitted.

Determination of Degrees of Reliability

In step S3031, the control unit 15, similarly to step S2050 in the second embodiment, controls the degree-of-reliability determining unit 105, and determines the degrees of reliability of the first distance image acquired by the first distance information acquiring unit 101 in step S1020 and the three-dimensional map held by the three-dimensional map holding unit 209.

Note that the degrees of reliability determined here may be used to update the uncertainty map disclosed in NPTL1. Accordingly, the uncertainty of the distance values acquired from the three-dimensional sensor can be set low, and a further improvement in accuracy can be expected.

Generation of Third Distance Information

In step S3032, the control unit 15, similarly to step S1060 in the first embodiment, controls the third distance information generating unit 106, and causes the third distance information generating unit 106 to generate a third distance image by combining the first distance information and a distance image generated from the three-dimensional map based on the degrees of reliability calculated in step S3031.

Calculation of Position and Orientation

In step S3035, the control unit 15 controls the position and orientation calculating unit 207, and calculates, based on the third distance image generated in step S3032, the position and orientation of the image capturing device 2 when the image acquired in step S1030 was captured. The specific calculation method is similar to that in step S2035 in the second embodiment.

[Effects]

As described above, in the third embodiment, the distance information acquired using the distance sensor and a SLAM three-dimensional map are combined and used for the estimation of position and orientation in CNN-SLAM (NPTL1). Accordingly, the accuracy of the three-dimensional map referred to when the position and orientation are calculated increases, and it becomes possible to calculate the position and orientation and to generate distance information in a more accurate and robust manner. Thus, automobile driving can be controlled more stably.

[Modification 1 of Third Embodiment]

In the third embodiment, a three-dimensional map is held and the estimation of position and orientation is performed according to the method disclosed in NPTL1, similarly to the second embodiment. However, the present invention is not limited to this, and any method may be adopted as long as the position and orientation of the image capturing device are estimated using third distance information generated by combining first distance information and second distance information. For example, the method disclosed in NPTL3 may be adopted.

[Modification 2 of Third Embodiment]

In the third embodiment, the position and orientation of the image capturing device 2 calculated by the position and orientation calculating unit 207 and the third distance information generated by the third distance information generating unit 106 are used for the recognition of the surrounding environment and the control of automobile driving. However, the configuration of the distance measurement device 100 may be used for the estimation of the self-position and orientation of a mobile robot to which a distance sensor and a monocular camera are installed or for the estimation of the self-position and orientation of a HMD or a mobile terminal.

Fourth Embodiment

The information processing apparatus and the driving-control system in the fourth embodiment perform segmentation into semantic regions at the same time as performing the estimation of distance on the image captured by the image capturing device 2, and determine degrees of reliability for the individual semantic regions. Note that, as disclosed in NPTL1, the estimation of second distance information and the segmentation into semantic regions may be performed at the same time using the same learning model.

[Description of Configuration]

Figure 8:
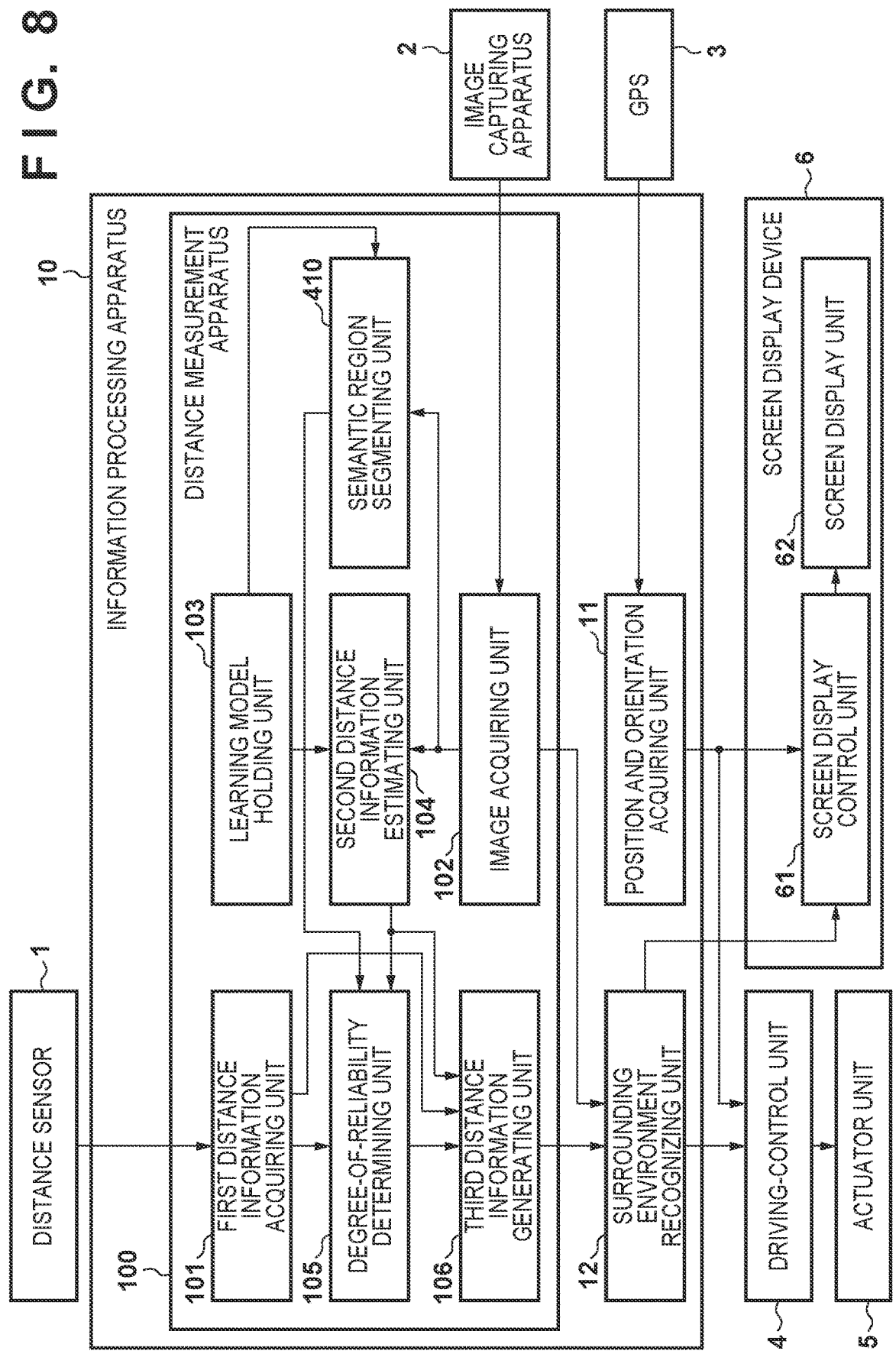
FIG. 8 is a block diagram illustrating a module configuration of a driving-control system according to a fourth embodiment.

FIG. 8 is a block diagram illustrating a module configuration of the information processing apparatus 10 and the driving-control system in the fourth embodiment. Components similar to those in the first embodiment (FIG. 2) are provided with the same reference numerals.

The fourth embodiment differs in that a semantic region segmenting unit 410 is added. This semantic region segmenting unit 410 segments the image acquired by the image acquiring unit 102 into semantic regions using the model held by the learning model holding unit 103, and provides the degree-of-reliability determining unit 105 with the segmented regions and information indicating the semantic meanings of the segmented regions. Semantic region segmentation is a method in which an image is segmented into regions corresponding to individual objects appearing in the image and subjects are classified for each segmented region, and a semantic region as referred to here is a region that has been segmented using the semantic region segmentation method and that has a semantic meaning (label). In the present embodiment, classification is performed into labels such as a wall surface, an upright object, a floor surface (road), a mountain, the sky, a tree, and a small object.

The degree-of-reliability determining unit 105 determines the degrees of reliability of the first distance information and the second distance information based on the supplied semantic regions.

[Processing Procedure]

Figure 9:
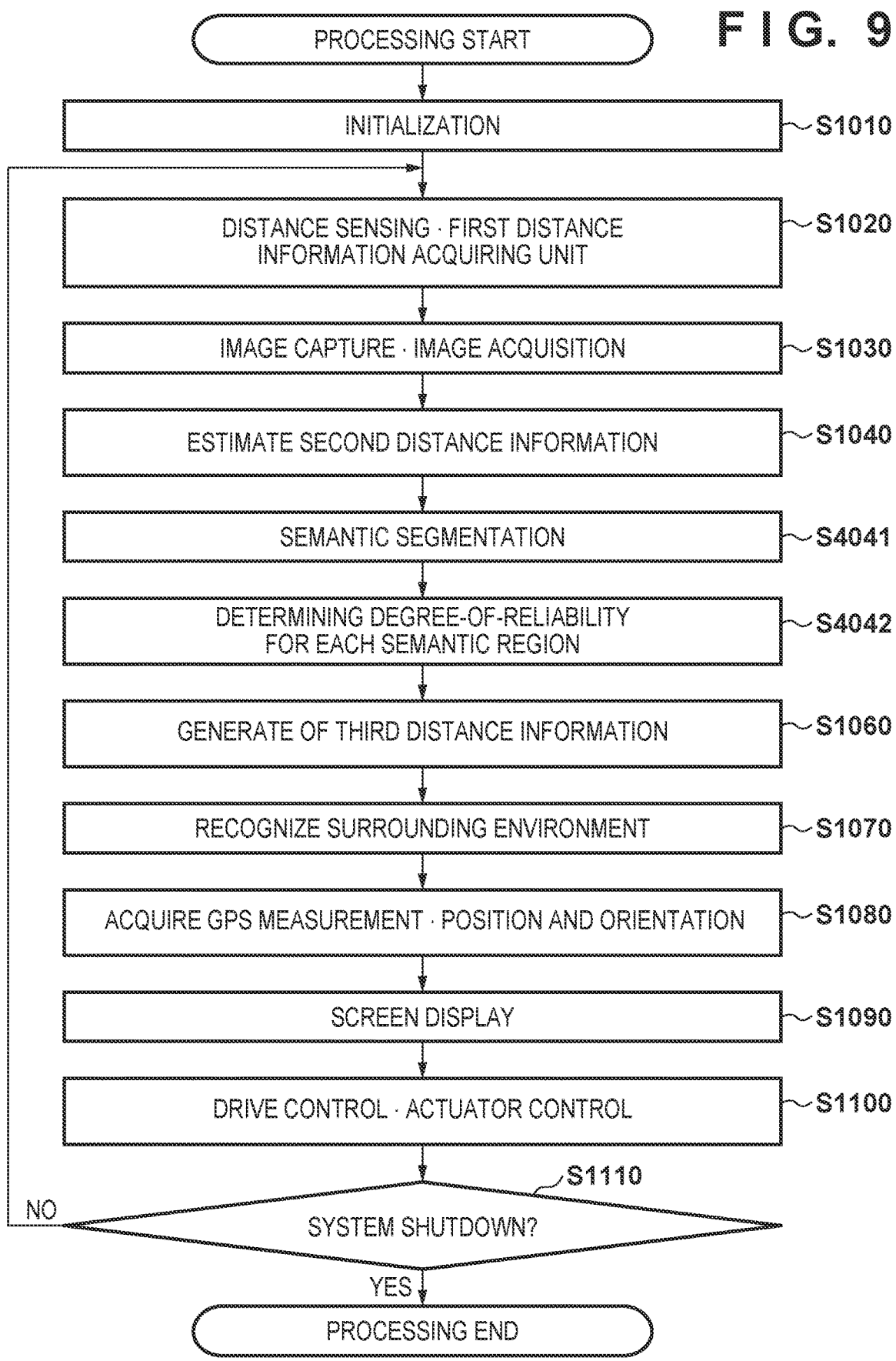
FIG. 9 is a flowchart illustrating a processing procedure of the driving-control system according to the fourth embodiment.

FIG. 9 is a flowchart illustrating a processing procedure of the driving-control system in the fourth embodiment. Processing similar to that in the first embodiment (FIG. 3) is provided with the same reference numeral. Furthermore, the differences from the first embodiment are that the semantic region segmentation processing is added as step S4041 between step S1040 and step S1050, and that the processing for determining degrees of reliability in step S1050 in FIG. 3 is replaced with the "determination of degrees of reliability of individual semantic regions" in step S4042.

In step S4041, the control unit 15 controls the semantic region segmenting unit 410, and segments the image acquired in step S1030 into semantic regions.

In step S4042, the control unit 15 controls the degree-of-reliability determining unit 105, and causes the degree-of-reliability determining unit 105 to determine, for each of the regions obtained by the segmentation in step S4041, the degrees of reliability of the first distance image acquired by the first distance information acquiring unit 101 in step S1020 and the second distance image estimated by the second distance information estimating unit 104 in step S1040. For example, for wall surface and upright object regions that directly face the distance sensor and that can be measured accurately, 1 is set as the degree of reliability of the first distance image and 0.5 is set as the degree of reliability of the second distance image. For road and floor surface regions that tend to have small angles relative to the optical axis of the distance sensor, 0.3 is set as the degree of reliability of the first distance information and 0.5 is set as the degree of reliability of the second distance image. For small object regions for which it can be considered that the accuracy of the estimation by the CNN would be low, 0.8 is set as the degree of reliability of the first distance image and 0.2 is set as the degree of reliability of the second distance image. For mountain and sky regions in which the subject is located far away or infinitely distant and tree regions which slightly sway and the distance values of which fluctuate, 0.2 is set as the degree of reliability of the first distance information and 0.8 is set as the degree of reliability of the second distance information.

The labels of the semantic regions and the method for determining degrees of reliability based on the labels are not limited to these, and any method may be adopted as long as an image is segmented into semantic regions and degrees of reliability are determined according to the semantic regions.

[Effects]

As described above, in the fourth embodiment, an image is segmented into semantic regions, degrees of reliability are determined for each semantic region, and distance information is generated by combining the distance information acquired by the distance sensor and the distance information estimated using the CNN. Accordingly, the distance information to which importance is given can be changed for individual distance measurement subjects, and the measurement of difficult subjects can be complemented with the estimation of distance by the CNN. Thus, automobile driving can be controlled more stably.

[Modification 1 of Fourth Embodiment]

In the fourth embodiment, an image is segmented into semantic regions by the CNN using the learning model in the semantic region segmentation processing. However, the method to be adopted is not limited to that in which CNN is used as long as segmentation into semantic regions can be performed, and a known region segmentation method or recognition method as disclosed in NPTL4 can be used, for example.

[Modification 2 of Fourth Embodiment]

The fourth embodiment has been described using the configuration of the first embodiment. However, application to the configuration of the second embodiment or the third embodiment may be performed.

Fifth Embodiment

In the fifth embodiment, an example will be described in which the information processing apparatus and the driving-control system do not generate the third distance information, and instead, update the first distance information or the second distance information when combining the first distance information and the second distance information and adopt the updated distance information as the third distance information.

[Description of Configuration]

Figure 10:
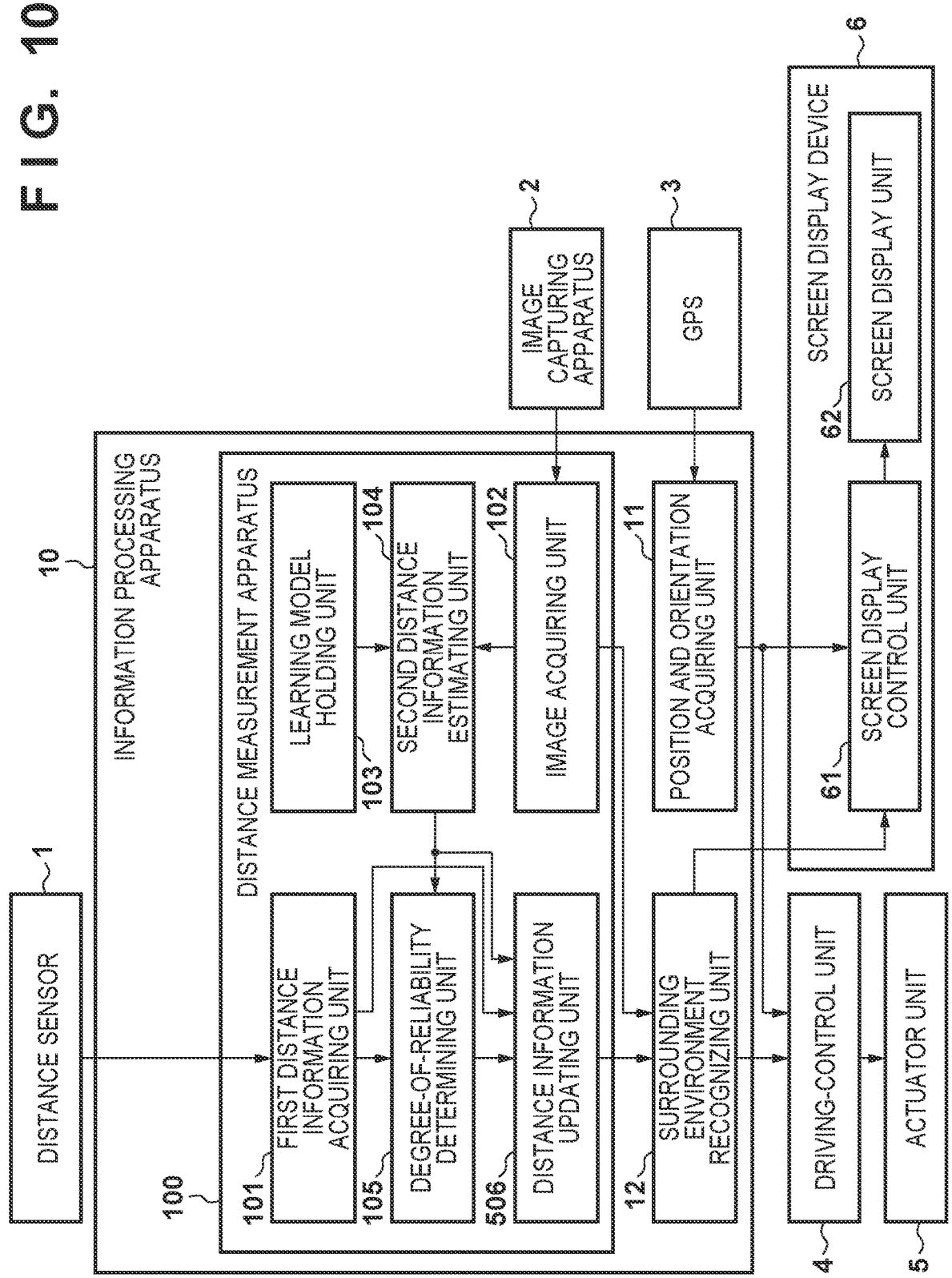
FIG. 10 is a block diagram illustrating a module configuration of a driving-control system according to a fifth embodiment.

FIG. 10 is a block diagram illustrating a module configuration of the information processing apparatus 10 and the driving-control system in the fifth embodiment. Components similar to those in the first embodiment (FIG. 2) are provided with the same reference numerals. The difference between the fifth embodiment and the first embodiment is that the third distance information generating unit 106 is replaced with a distance information updating unit 506.

The distance information updating unit 506 updates the first distance information acquired by the first distance information acquiring unit 101 based on the second distance information estimated by the second distance information estimating unit 104 and the degrees of reliability determined by the degree-of-reliability determining unit 105, or updates the second distance information based on the first distance information and the degrees of reliability.

[Processing Procedure]

Figure 11:
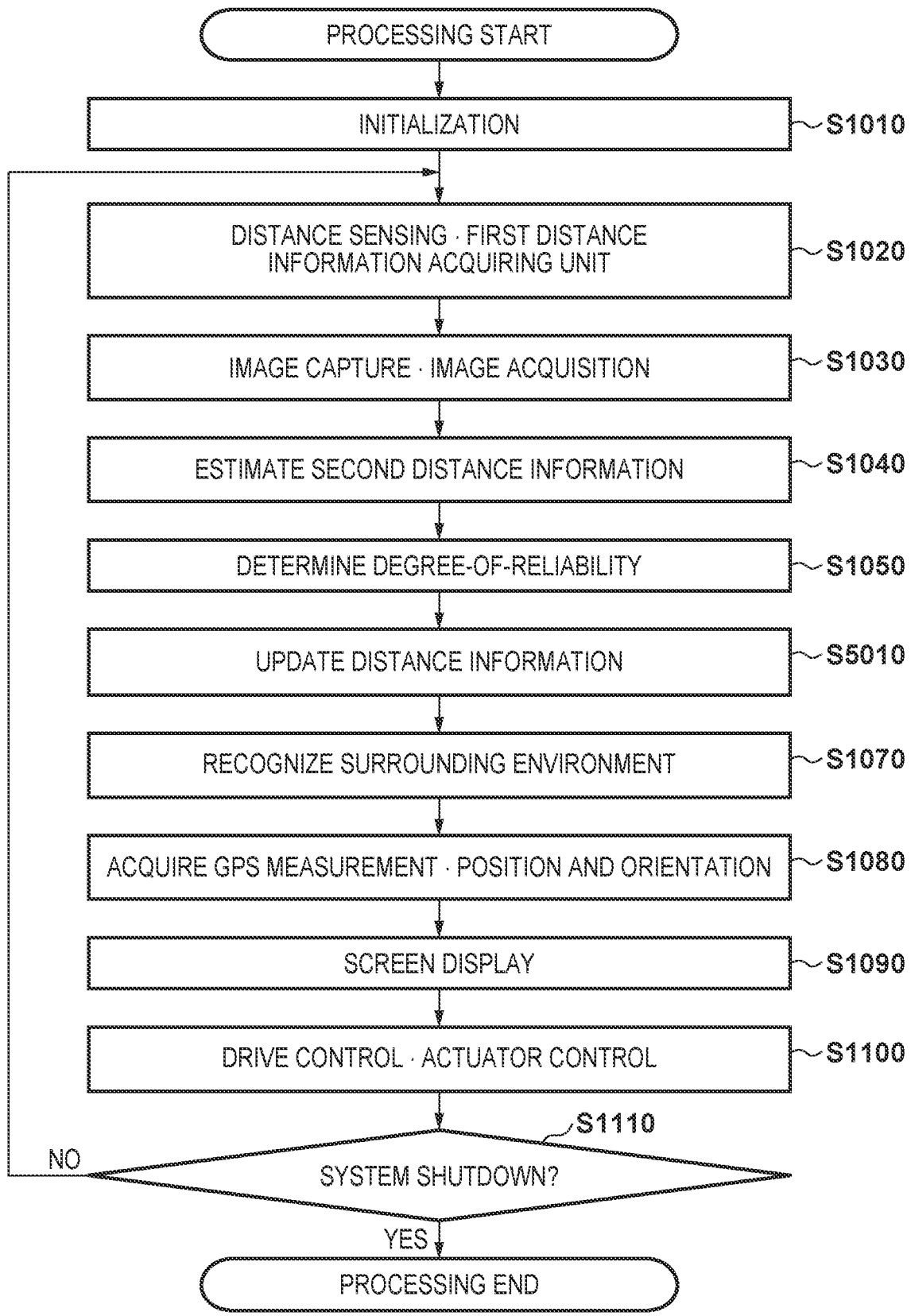
FIG. 11 is a flowchart illustrating a processing procedure of the driving-control system according to the fifth embodiment.

FIG. 11 is a flowchart illustrating a processing procedure of the driving-control system in the fifth embodiment. Processing similar to that in the first embodiment (FIG. 3) is provided with the same reference numeral. Furthermore, the difference from the first embodiment is that "updating of distance information" in step S5010 is included in place of step S1060.

In step S5010, the distance information updating unit 506 projects the first distance information acquired in step S1020 onto the second distance information acquired in step S1040. Furthermore, for pixels the degrees of reliability of which in the first distance information are higher than or equal to a preset threshold, the distance information updating unit 506 replaces the pixel values (distances) in the second distance information with the pixel values in the first distance information. The distance information updating unit 506 supplies the updated second distance information to the surrounding environment recognizing unit 12 as the third distance information. Note that updating with values calculated by weighted averaging in which the degrees of reliability are used as the weights may be performed. In addition, the second distance information may be projected onto the first distance information, and the first distance information may be updated using the degrees of reliability.

[Effects]

As described above, the third distance information is not generated, and the first distance information or the second distance information is updated when the first distance information and the second distance information are combined. Accordingly, the memory area for calculation can be reduced.

Embodiments pertaining to the present invention have been described above. Here, the effects of the embodiments described up to this point are summarized as below.

According to the first embodiment, by generating the third distance information by combining the distance information acquired by the distance sensor and the distance information estimated from an image captured by the monocular camera using the CNN, distances can be measured even in environments or portions the distances of which cannot be acquired using only the distance sensor.

According to the second embodiment, by executing SLAM in which the distance information estimated from an image captured by the monocular camera using the CNN is used, the accuracy of distance information can be increased using time-series information, and the measurement of distance can be performed with higher accuracy than in the first embodiment.

According to the third embodiment, by combining the distance information acquired by the distance sensor and a three-dimensional map constructed by SLAM and using the result for the estimation of the position and orientation of the image capturing device, the accuracy of the estimation of the position and orientation and the accuracy of the three-dimensional map that is constructed increase.

According to the fourth embodiment, by segmenting an image captured by the image capturing device into semantic regions and determining weights to be used in the combining for the individual regions, the combining can be performed while taking into consideration the strong and weak points of the measurement methods for each semantic region.

According to the fifth embodiment, by using one of the first distance information and the second distance information to update the other, rather than newly creating the third distance information, the memory area for calculation can be reduced.

This concludes the description. The distance information in the present invention refers to that including information of distance, such as a distance image, a distance point group, or a three-dimensional point group. The distance sensor may be any device capable of measuring distance, such as a device performing laser ranging measurement such as LiDAR, or a device performing passive-stereo measurement or active-stereo measurement. The learning model is a model for estimating distance information from monocular images that has learned through deep learning.

The present invention aims to provide a technique for obtaining distance information maintaining high accuracy in various scenes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
(A) one or more circuits, or
(B) at least one processor and at least one memory, or
(C) at least one processor, at least one memory, and one or more circuits,
wherein the (A) one or more circuits, (B) at least one processor and at least one memory, or (C) at least one processor, at least one memory, and one more circuits is configured to function as a plurality of units comprising:
(1) a first acquiring unit configured to acquire first distance image information comprising distance as a pixel value using a distance sensor;
(2) a second acquiring unit configured to acquire an image captured by an image capturing device;
(3) an estimating unit configured to estimate second distance image information comprising distance as a pixel value from the image acquired by the second acquiring unit using a learning model which has been generated so as to output distance image information corresponding to an input image; and
(4) a calculation unit configured to calculate third distance image information comprising distance as a pixel value in accordance with (a) the first distance image information and (b) the second distance image information.

2. The information processing apparatus according to claim 1, wherein the plurality of units further comprises:
a map holding unit configured to hold, as a three-dimensional map, a position and orientation of the image capturing device and distance image information corresponding to the position and orientation;
a position-and-orientation-calculation unit configured to calculate a position and orientation of the image capturing device based on the three-dimensional map and the image acquired by the second acquiring unit;
an updating unit configured to update the three-dimensional map based on the position and orientation calculated by the position-and-orientation-calculation unit and the second distance image information estimated by the estimating unit; and
a degree-of-reliability-determining unit configured to determine a degree of reliability of the first distance image information and the distance image information in the three-dimensional map, and
wherein the calculation unit calculates the third distance image information based on (1) the first distance image information, (2) the distance image information in the three-dimensional map updated by the updating unit, and (3) the degree of reliability.

3. The information processing apparatus according to claim 2, wherein the degree-of-reliability-determining unit determines the degree of reliability based on whether or not the first distance image information is present.

4. The information processing apparatus according to claim 2, wherein the distance sensor is a LIDAR-based sensor, and
wherein the degree-of-reliability-determining unit determines a degree of reliability of the first distance image information in accordance with the intensity of laser light reflected from a target object.

5. The information processing apparatus according to claim 2, wherein the degree-of-reliability-determining unit determines a degree of reliability of the first distance image information based on an operating distance of a sensor.

6. The information processing apparatus according to claim 2, wherein the degree-of-reliability-determining unit determines the degree of reliability based on continuity of distance information.

7. The information processing apparatus according to claim 2, wherein the distance sensor is a stereo-type distance sensor, and
wherein the degree-of-reliability-determining unit performs the determination based on a degree of similarity in stereo matching performed when the distance sensor acquires distance image information.

8. The information processing apparatus according to claim 2, wherein the plurality of units further comprises a semantic region segmenting unit configured to segment the image acquired by the second acquiring unit into semantic regions, and
wherein the calculation unit combines the first distance image information and the distance image information in the three-dimensional map updated by the updating unit based on the semantic regions.

9. The information processing apparatus according to claim 1, wherein a position and an orientation of the information processing apparatus are estimated using the third distance image information.

10. The information processing apparatus according to claim 1, wherein the plurality of units further comprises:
an environment recognizing unit configured to recognize a surrounding environment based on the third distance image information and the image acquired by the second acquiring unit; and
a position-and-orientation-acquiring unit configured to acquire a position and an orientation of the apparatus relative to the environment.

11. A vehicle driving support system comprising: the distance sensor; the image capturing device; and the information processing apparatus according to claim 2.

12. The vehicle driving support system according to claim 11, further comprising an actuator for controlling the movement of a vehicle, wherein the plurality of units further comprises a driving-control unit configured to control the actuator based on (1) the surrounding environment, (2) the position, and (3) the orientation.

13. A control method for an information processing apparatus comprising a holding unit which holds a learning model for estimating distance information from images, the control method comprising:
acquiring first distance image information comprising distance as a pixel value using a distance sensor;
acquiring an image captured by an image capturing device;
estimating second distance image information comprising distance as a pixel value from the acquired image using a learning model which has been generated so as to output distance image information corresponding to an input image; and
calculating third distance image information comprising distance as a pixel value in accordance with (a) the first distance image information and (b) the second distance image information.

14. A non-transitory computer-readable storage medium storing a program which causes, when read and executed by a computer, the computer to execute a control method for an information processing apparatus comprising a holding unit which holds a learning model for estimating distance information from images, the control method comprising:
acquiring first distance image information comprising distance as a pixel value using a distance sensor;
acquiring an image captured by an image capturing device;
estimating second distance image information comprising distance as a pixel value from the acquired image using a learning model which has been generated so as to output distance image information corresponding to an input image; and
calculating third distance image information comprising distance as a pixel value in accordance with (a) the first distance image information and (b) the second distance image information.

15. The information processing apparatus according to claim 1, wherein the plurality of units further comprises a degree-of-reliability-determining unit configured to determine a first degree of reliability of the first distance image information and a second degree of reliability of the second distance image information, and
wherein the calculation unit calculates the third distance image information by performing weighted averaging of the first distance image information and the second distance image information using the first degree of reliability and the second degree of reliability.

16. The information processing apparatus according to claim 15, wherein the distance sensor is a LIDAR based sensor, and
wherein the degree-of-reliability-determining unit determines the first degree of reliability in accordance with the intensity of laser light reflected from a target object, and determines the second degree of reliability in accordance with likelihood of the estimation of the second distance image information using the learning model.

17. The information processing apparatus according to claim 15, wherein the degree-of-reliability-determining unit determines the first degree of reliability and the second degree of reliability based on continuity of distance image information.

18. The information processing apparatus according to claim 15, wherein the distance sensor is a stereo-type distance sensor, and
wherein the degree-of-reliability-determining unit performs the determination based on a degree of similarity in stereo matching performed when the distance sensor acquires distance image information.

* * * * *